United States Patent [19]
Coombs

[11] Patent Number: 5,949,582
[45] Date of Patent: Sep. 7, 1999

[54] THERMAL IMAGING CAMERA

[76] Inventor: Christopher E. Coombs, 11 Parkway Cir., Churchman's Center, New Castle, Del. 19720

[21] Appl. No.: 09/124,392

[22] Filed: Jul. 29, 1998

Related U.S. Application Data

[60] Provisional application No. 60/054,005, Jul. 29, 1997.
[51] Int. Cl.⁶ .................................................. G02B 27/14
[52] U.S. Cl. ............................................................. 359/630
[58] Field of Search .............................. 359/630; 345/7, 345/8; 348/164, 165, 166, 167, 168

[56] References Cited

U.S. PATENT DOCUMENTS

| | | | |
|---|---|---|---|
| 5,089,914 | 2/1992 | Prescott | 359/815 |
| 5,534,694 | 7/1996 | Ball et al. | 250/330 |
| 5,813,990 | 9/1998 | Ryll | 600/500 |

*Primary Examiner*—Georgia Epps
*Assistant Examiner*—Ricky Mack
*Attorney, Agent, or Firm*—Connolly & Hutz

[57] ABSTRACT

A facepiece assembly and a self-contained thermal imaging system comprises a facepiece that includes a front lens, an air inlet for receiving air under pressure, and an air outlet. The thermal imaging system includes a sensor lens connected to the front lens of the facepiece, and a rotating chopper wheel within the facepiece adjacent the sensor lens. A thermal imager sensor head produces digitized electronic data based upon an image projected onto the sensor head by the sensor lens and the rotating chopper wheel. An electronic processor is connected between the thermal imager sensor head and a heads-up display for processing the digitized electronic data and displaying the image on the heads-up display.

5 Claims, 2 Drawing Sheets

THERMAL IMAGING CAMERA

CROSS-REFERENCE TO RELATED APPLICATION

The present invention claims the benefit of provisional application Ser. No. 60/054,055 filed Jul. 29, 1997.

BACKGROUND OF THE INVENTION

The present invention relates to a new and improved thermal imaging system, and more particularly to a thermal imaging system that provides the wearer with a thermal image in the wearer's field of view permitting the wearer to see objects radiating thermal energy in the infrared spectrum. Otherwise such objects would be obscured from the wearer's view due, for example, to dense smoke encountered in a fire. The thermal imaging system also permits viewing of fire or other hot spots radiating energy in the infrared range but obscured, for example, by a wall or a roof.

Thermal imaging systems are known in the art for providing a person with an image of objects radiating energy in the infrared range. Also known are combination helmet and thermal camera arrangements such as disclosed in U.S. Pat. No. 5,089,914, issued Feb. 18, 1982, and hereby incorporated by reference as if fully reproduced herein.

However, there still exists a need in the art for a new and improved thermal imaging system which is particularly useful when embodied as a combination fireman's facepiece thermal imaging system wherein the thermal imaging system is advantageously mounted to provide the fireman with hands-free wearing of the facepiece and the thermal imaging system. The fireman's ability to wear the combination while engaged in fire fighting provides the fire fighter with the thermal image of objects he cannot otherwise see with his natural eyesight, such as, for example, bodies of unconscious but alive fire and smoke victims present at a fire scene. There also exists a need in the fire fighting art for mounting the thermal or infrared camera of such a thermal imaging system in a temperature protected manner so as to reduce the influence of a heated environment such as is present at a fire scene, on the camera which is thermal sensitive.

Firefighters, emergency responders and some industrial workers are exposed to extremely hazardous, toxic and hostile atmospheres in the fulfillment of their assigned duties. To accommodate the lethal atmosphere, these workers use what is called self-contained breathing apparatus. The self-contained breathing apparatus most often is an open-circuit breathing apparatus where compressed air is carried on the back in a carefully engineered, user friendly harness which spreads the load of the cylinder weight onto the user in a way that minimizes the discomfort and exhaustion carrying that weight might otherwise cause.

The self-contained breathing apparatus provides fresh, breathable air to the user while he is in an atmosphere that is hostile. In many cases, this hostile atmosphere either is or can quickly become difficult to see through. For firefighters particularly, this is the most common experience in an actual structural fire fight. At the very moment when their eyesight is of its premium value to them, they lose sight completely because the denseness of the smoke that surrounds them. Not even the fire itself can be seen through this atmosphere much less anyone they might be trying to find and rescue or any other hazards that might impede their escape or injure them, which might be avoidable if they could see.

For some workers, night work is also a factor. The lack of light or the potential loss of light should the artificial means of lighting fail, might render the worker in a dangerous situation which he could avoid if he could see.

Thermal imaging systems are available in a relatively large, bulky and hand-held format. These thermal imagers operate very effectively, but their hand-held nature turns the user into a "cameraman" because the camera completely occupies his hands and attention. Also, helmet mounted thermal imaging systems have been proposed such as disclosed in U.S. Pat. No. 5,089,914 and EP 0 822 030 A1, hereby incorporated by reference as if fully reproduced herein.

In EP 0 622 030 A1 the image sensor itself, along with a very limited amount of electronic processing equipment are mounted to a pod below the rim of the helmet with a heads-up display mounted at the front of the helmet. A counterweight is mounted at the rear of the helmet, and a power and electronic processing unit is displaced from the helmet by a series of wires. This product made the helmet mounted thermal imager an actual practicality for a broad spectrum of uses, not the least of which is firefighting and emergency response.

Helmets are still very heavy. Neck fatigue remains a factor, and continuity of operations also becomes more difficult because when the need for the thermal imager and its additional weight are removed as a consequence of the atmosphere becoming clear and/or breathable, the thermal imager user typically has to remove himself from the scene, whatever the remaining work might be, in order to remove the very heavy helmet and put his own lighter helmet back on and go back to work. The interruption can be at best a nuisance and at worst a potentially dangerous situation. The size of the helmet with its mounted thermal imager is too large to display to some other part of the body and switch-out helmets while working.

Based upon their assessment of the situation, the firefighters, emergency responders or workers may elect to go in to their work environment without a helmet mounted system, and instead use their normal personal helmet. The atmosphere could then deteriorate, forcing a retreat and precious time lost to re-equip themselves with the helmet mounted system before handling the work in the darkened environment.

Because the thermal image sensor in helmet mounted systems and hand-held systems are mounted in a captive atmosphere (encased in a protective envelope), the sensor is prone to overheating and when this occurs the sensor "whites out", negating any image at a moment when a user might critically need it. Each of the different technologies has a different level of heat sensitivity before this "white out" occurs. Because the sensor is mounted in a static atmosphere in its protective containment, any prolonged exposure to high heat will eventually have this effect.

The match up of the thermal imager to the helmet did relieve the user of his need to hold the imager with his hands. This is an advantage of the helmet mounted systems over hand-held systems. However, the helmet mounted systems are not matched in a way to maximize the utility of both the helmet and the thermal imager. The helmet is used in just about any and every potentially dangerous work environment. The thermal imager is only used when an atmosphere becomes so hostile and dark that it renders the worker blind. Self-contained breathing apparatus matches, more exactly, the work environment in which the thermal imager is needed.

The wires and harnesses that link the helmet mounted thermal image sensor and heads-up display with the power and electronic processing unit worn on the firefighter's body somewhere, are another set of wires and/or potential snag hazards that the user must deal with and think about as he is using the equipment.

SUMMARY OF THE INVENTION

Accordingly, it is an object of the present invention to provide a facepiece assembly and self-contained thermal imaging system which is simple in construction, easy to use and extremely effective in permitting the wearer to see objects radiating thermal energy in the infrared spectrum which otherwise would be obscured from the wearer's view due to dense smoke and the like.

In the invention, a thermal image sensor, complete with lens and "chopping wheel" is mounted to a special lens which is configured to accept this hardware. The lens is fully integrated into a facepiece seal and head harness assembly like the user's normal facepiece. All of the electronics which interpret the image detected by the thermal sensor are positioned within the facepiece. A wire harness which communicates the image from the sensor to the processing unit and then from a processing unit back to the special heads-up display also contained in a special thermal imaging facepiece, is integrated fully into the facepiece.

By setting up the thermal imager in this matter, all of the deficiencies experience with the helmet mounted and hand-held systems are fully addressed. First, the weight of the helmet returns to normal. The weight of the thermal imaging sensor and heads-up display in a special facepiece assembly is worn close to the face and in perfect alignment with the center of gravity of the head. Because the assembly matches the center of gravity of the wearer's head, he is benefitted by less neck fatigue than with the helmet mounted systems where the center of gravity may closely match the head's center of gravity in a static state but fail to lower the center of gravity below the helmet fit line in a dynamic situation. In other words, when the user moves, the center of gravity of the helmet mounted systems reestablishes itself at the point where the system is carried on the head, which is at the helmet fit line, fully and inch plus above the head's natural center of gravity.

Also, because the present facepiece assembly has a thermal imaging system mounted within the facepiece, it can easily be switched with the normal facepiece to provide the user with the freedom to elect normal vision or thermal image vision, depending on the circumstances, without removing himself to switch helmets.

Also, because the thermal imager is mounted on the facepiece instead of in the helmet, there is no need to concern oneself with the availability of the thermal imager when sizing up the works situation. The thermal imager is simply carried in a passive state on the back frame assembly of self-contained breathing apparatus and can be put into action at any time by simply switching facepieces. The firefighter's helmet returns to its normal weight. This is important for the designers and engineers who concern themselves with human factors involving weight displaced above the neck. Tests have shown that the less weight carried on the head, the less fatigue a helmet user will experience.

BRIEF DESCRIPTION OF THE DRAWINGS

Novel features and advantages of the present invention in addition to those discussed above will become apparent to persons of ordinary skill in the art from reading of the following detailed description in conjunction with the accompanying drawings wherein similar reference characters refer to similar parts and in which.

DETAILED DESCRIPTION OF THE INVENTION

Referring in more particularity to the drawings, FIGS. 1–4 illustrate a self-contained thermal imaging system 10 mounted to a detachable facepiece assembly 12 of standards breathing apparatus 14 that includes an air supply cylinder (not shown). Facepiece assembly 12 is releasably connected to the breathing apparatus by a hose assembly (not shown) to communicate air from the cylinder to the facepiece. A suitable connection 14 is positioned on the facepiece assembly 12 for attachment of the hose assembly. Features of the facepiece are shown in U.S. Des. 336,546, issued Jun. 15, 1993, and hereby incorporated by reference as if fully reproduced herein.

Figure 1:
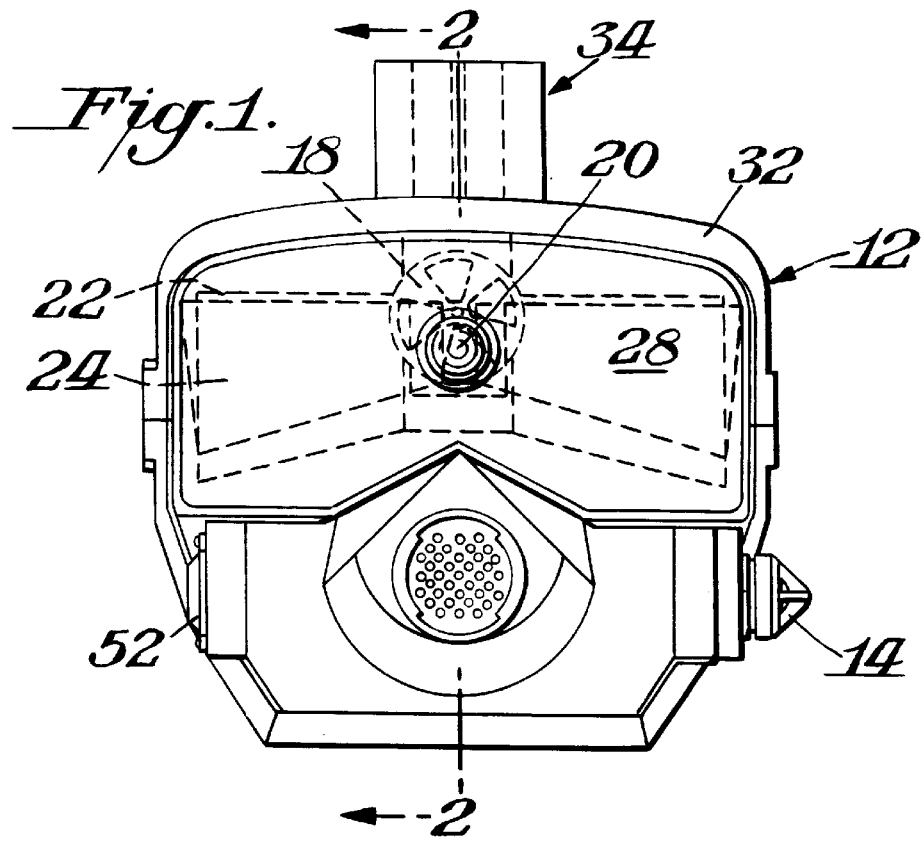
FIG. 1 is a front elevational view of a facepiece assembly with a self-contained thermal imaging system, according to the present invention.
Figure 2:
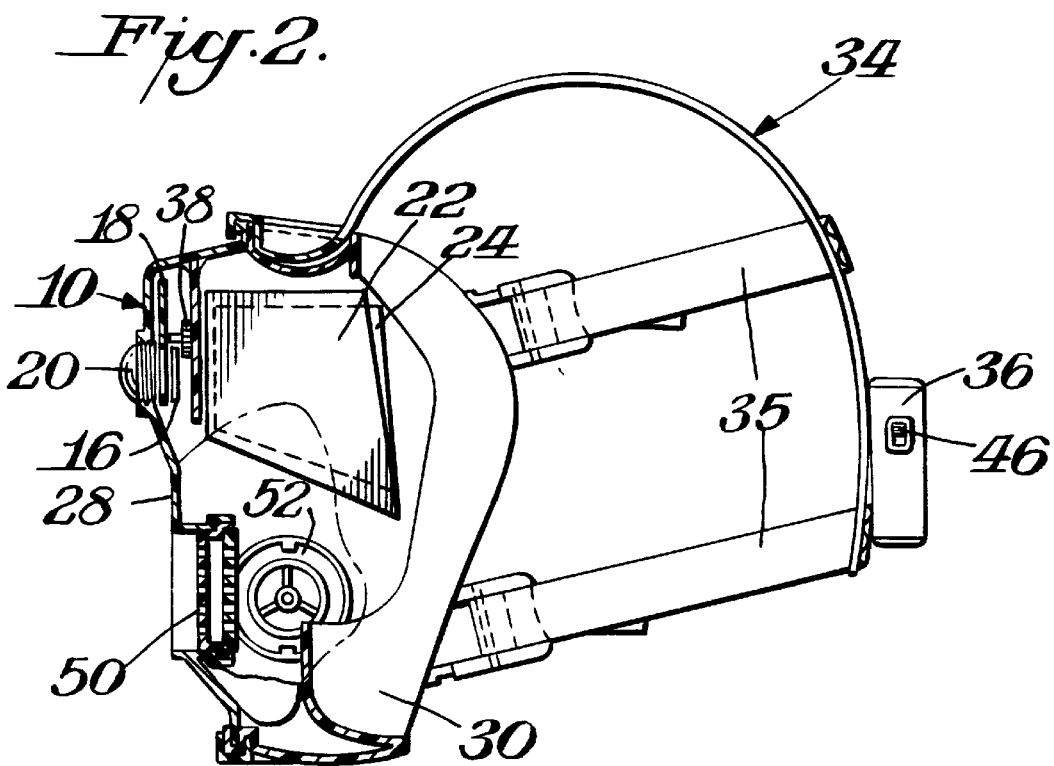
FIG. 2 is a cross-sectional view in elevation of the facepiece assembly and self-contained thermal imaging system taken along line 2—2 of FIG. 1.
Figure 3:
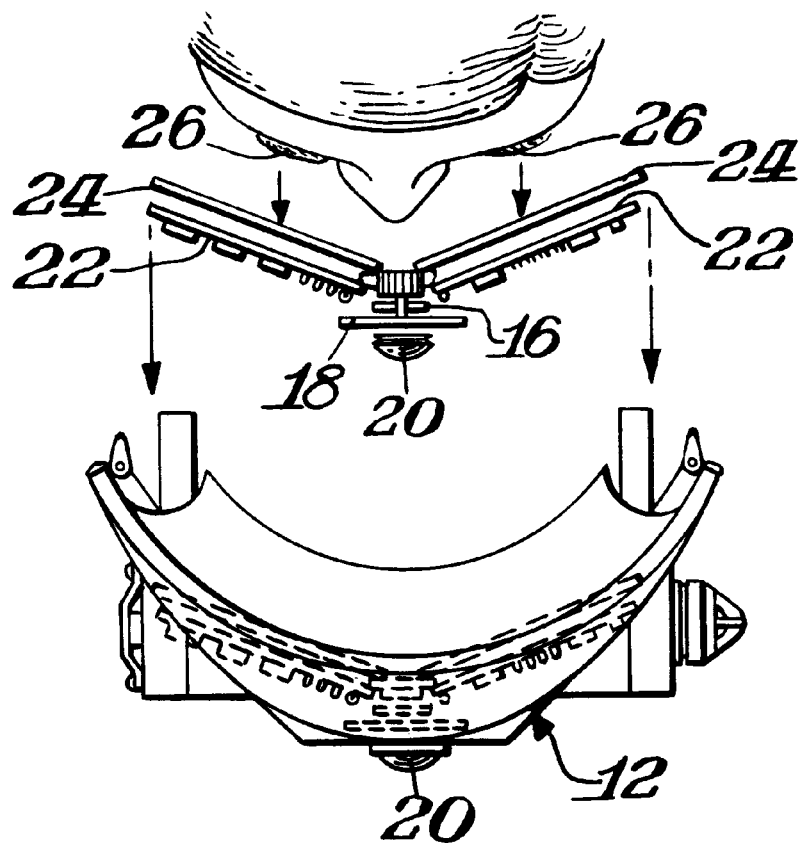
FIG. 3 is an exploded top plan view of the facepiece assembly and self-contained imaging system of FIGS. 1 and 2, relative to the head and eyes of the user.
Figure 4:
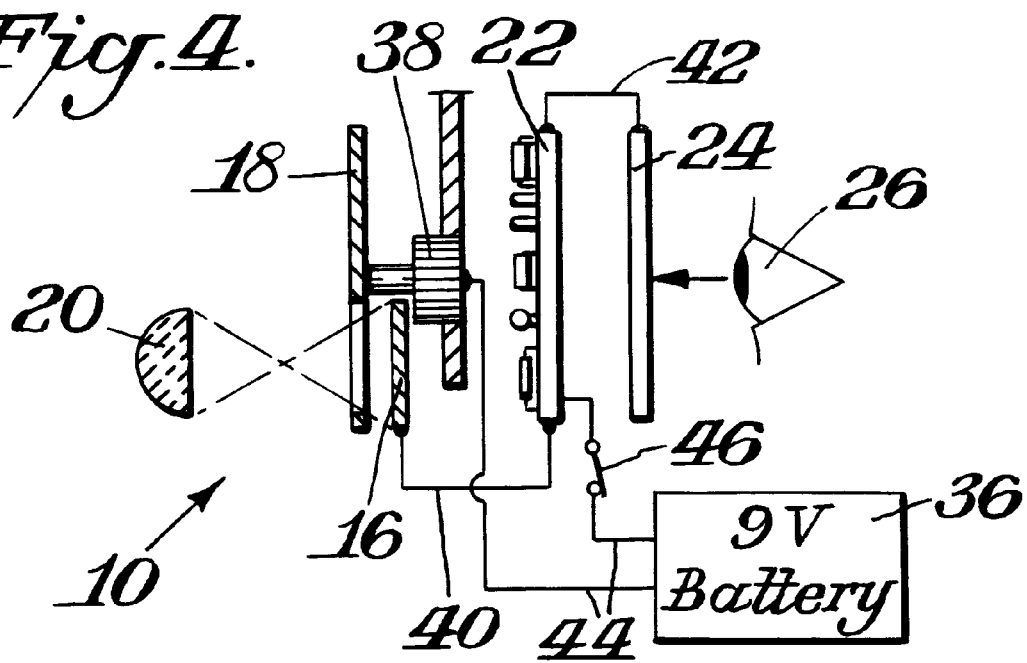
FIG. 4 is a schematic view illustrating the relationship between key components of the self-contained thermal imaging system.

The thermal imaging system 10 includes a thermal imager sensor head 16 and a chopper wheel assembly 18, both mounted behind a sensor lens 20 displaced at the front of facepiece assembly 12. Preferably, the sensor lens comprises a convex lens with a 60° included angle. The thermal system further includes processor boards 22 and a heads-up display 24 disposed directly opposite the eyes 26 of the user, as best shown in FIG. 3.

Facepiece assembly 12 includes an outer transparent lens 28, and a peripheral seal 30 projects from lens 28 to the face of the user. A peripheral clamp 32 secures seal 30 to lens 28. A head harness assembly 34 including adjustable side straps 36 is attached to the clamp 32 to facilitate positioning the facepiece assembly and the thermal imaging system into position thereafter holding lens 28 in place. A battery pack 36 is located at the back head harness assembly 34 for supplying energy to the thermal imaging system 10, as explained more fully below.

An image in the view of the sensor lens 20 is shuddered by the rotating chopper wheel 18. A suitable motivator 38 is connected to rotate the chopper wheel as is well known in the art. The sensor lens 20 and the chopper wheel assembly 18 function to project the viewed image onto image sensor head 16. Sensor head 16 is a matrix or grid which produces a digitized electronic series of values based upon the image projected onto each segment of the grid. This electronic signal is conveyed by circuit 40 to the processor boards 22 where the image is processed from infrared to a visible image. The processed image is then conveyed by a cable harness 42 to the heads-up display 24 in the form of a liquid crystal diode or other low-voltage imaging screen material which displays the image. The visible image is compensated for focus and the user gets a full picture of the viewed image. The processor boards 22 are powered by the system power supply 36. A wire harness 44 extends from power supply 36 to the processor boards 22 and the motivator 38. An on/off switch 46 is provided in wire harness 44 for activating the self-contained thermal imaging system 10.

The facepiece assembly also includes a speech diagram 50 and an exhalation or outlet valve 52. When the facepiece assembly is properly positioned on the face of the user, an interior space 54 is defined between the face of the user and the lens 28 of the assembly. This space is cooled by the supply air entering inlet 14. The expansion of the air as it enters interior space 54 produces a cooling effect for the thermal imaging system 10 located with space 54. As a result, overheating of the imaging system is avoided as well as the resultant disadvantages such as overheating of the sensor which produces "white outs". Generally, the space 54 is maintained at a temperature of approximately 100° F.

What is claimed is:

1. A facepiece assembly and a self-contained thermal imaging system comprising a facepiece including a front lens, an air inlet for receiving air under pressure, and an air outlet, and the thermal imaging system including a sensor lens connected to the front lens of the facepiece, rotating chopper wheel within the facepiece adjacent the sensor lens, a thermal imager sensor head that produces digitized electronic data based upon an image projected onto the thermal imager sensor head by the sensor lens and the rotating chopper wheel, a heads-up display, and processor means connected between the thermal imager sensor head and the heads-up display for processing the digitized electronic indicia and displaying the image on the heads-up display.

2. A facepiece assembly and a self-contained thermal imaging system as in claim 1 wherein the facepiece includes a peripheral seal for placement against the face of a user.

3. A facepiece assembly and a self-contained thermal imaging system as in claim 1 wherein the facepiece assembly includes a head harness assembly for holding the facepiece against the face of a user.

4. A facepiece assembly and a self-contained thermal imaging system as in claim 3 wherein the self-contained thermal imaging system includes a power source secured to the head harness assembly and connected to the processor means and the heads-up display.

5. A facepiece assembly and a self-contained thermal imaging system as in claim 1 wherein the sensor lens is a convex lens with an included angle 60°.

* * * * *

UNITED STATES PATENT AND TRADEMARK OFFICE
CERTIFICATE OF CORRECTION

PATENT NO. : 5,949,582
DATED : September 7, 1999
INVENTOR(S) : Christopher E. Coombs It is certified that error appears in the above-identified patent and that said Letters Patent is hereby corrected as shown below:

Column 1, line 6, delete "60/054,055" should read -- 60/054,005 -- ; at line 23, "1982" should read -- 1992 --; and at line 37, after "infrared" insert -- sensor --.

Column 2, line 9, "EP 0 822 030 A1" should read -- EP 0 622-030 A1 --.

Column 4, line 17, "standards" should read -- standard --; and line 40, "36" should read -- 35 --.

Column 5, line 16 (claim 1, line 5), after "facepiece," insert -- a --.

Signed and Sealed this

Twenty-ninth Day of February, 2000

Attest:

Q. TODD DICKINSON

Attesting Officer

Commissioner of Patents and Trademarks